(12) United States Patent
Chang et al.

(10) Patent No.: US 7,707,344 B2
(45) Date of Patent: Apr. 27, 2010

(54) INTERRUPT MITIGATION ON MULTIPLE NETWORK ADAPTERS

(75) Inventors: Fu-Chung Chang, Rhinebech, NY (US); Carol L. Soto, Highland, NY (US); Jian Xiao, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 12/021,949

(22) Filed: Jan. 29, 2008

(65) Prior Publication Data

US 2009/0193168 A1 Jul. 30, 2009

(51) Int. Cl.
*G06F 13/00* (2006.01)
(52) U.S. Cl. .................. 710/268; 710/262; 710/267; 718/105; 719/318
(58) Field of Classification Search .............. 710/262, 710/266–268; 718/105; 719/318
See application file for complete search history.

(56) References Cited

U.S. PATENT DOCUMENTS

| | | | | |
|---|---|---|---|---|
| 5,179,707 A | * | 1/1993 | Piepho | 710/260 |
| 5,412,782 A | | 5/1995 | Hausman et al. | |
| 5,437,042 A | * | 7/1995 | Culley et al. | 710/28 |
| 5,815,501 A | | 9/1998 | Gaddis et al. | |
| 6,222,850 B1 | | 4/2001 | Johnson | |
| 6,237,058 B1 | * | 5/2001 | Nakagawa | 710/260 |
| 6,594,283 B1 | | 7/2003 | Horspool et al. | |
| 6,631,422 B1 | | 10/2003 | Althaus et al. | |
| 6,987,961 B1 | | 1/2006 | Pothana | |
| 7,010,613 B2 | | 3/2006 | Connor | |
| 7,161,950 B2 | | 1/2007 | Saxena | |
| 7,233,604 B1 | | 6/2007 | Bemanian et al. | |
| 2002/0099893 A1 | * | 7/2002 | Nguyen et al. | 710/260 |
| 2006/0112208 A1 | * | 5/2006 | Accapadi et al. | 710/265 |
| 2006/0282591 A1 | * | 12/2006 | Krithivas | 710/269 |
| 2007/0043970 A1 | * | 2/2007 | Solomita et al. | 714/10 |
| 2008/0082710 A1 | * | 4/2008 | Nijhawan et al. | 710/260 |
| 2008/0172511 A1 | * | 7/2008 | Takata et al. | 710/260 |

OTHER PUBLICATIONS

Barczyk et al., High Rate Packets Transmission on Ethernet LAN Using Commodity Hardware, IEEE Transaction on Nuclear Science, Jun. 2006, vol. 53, No. 2.

* cited by examiner

*Primary Examiner*—Glenn A Auve
(74) *Attorney, Agent, or Firm*—Jose Gutman; Fleit Gibbons Gutman Bongini & Bianco P.L.

(57) ABSTRACT

A method, information processing system, and computer readable medium, mitigate processor assignments. A first processor in a plurality of processors is assigned to a first communication port in a plurality of communication ports. An interrupt associated with the first communication port is generated. An assignment of a processor other than the first processor to handle the interrupt is inhibited.

20 Claims, 5 Drawing Sheets

INTERRUPT MITIGATION ON MULTIPLE NETWORK ADAPTERS

STATEMENT REGARDING FEDERALLY SPONSORED RESEARCH OR DEVELOPMENT

This invention was made with Government support under Agreement No. HR0011-07-9-0002 awarded by DARPA. The Government has certain rights in the invention.

FIELD OF THE INVENTION

The present invention generally relates to the field of networking, and more particularly relates to mitigating interrupts in a multi-network adapter environment.

BACKGROUND OF THE INVENTION

Recently, Ethernet technology has achieved amazing wire speeds. This drastic increase in transmission speed has been problematic for driver developers when creating drivers that are able to achieve high performance in Symmetric Multiprocessing ("SMP") systems. The Ethernet adapters can achieve high wire speed and output a large number of packets, but sometimes the host system is too slow to process all the packets being received. For example, consider an SMP system with a PCI-E Ethernet adapter with 4×1 Gb/s ports. This Ethernet adapter can achieve a throughput of 941 Mb/s with just one port and a throughput of 2860 Mb/s when using all the ports together. The ideal throughput of the adapter using all ports should be 3764 Mb/s. As can be seen, this system is not achieving the achieving the ideal throughput and is not scaling linearly.

This problem occurs because the Ethernet adapter has four ports that share the same Interrupt Request ("IRQ") line. An interrupt raised by this adapter is represented by an interrupt vector. This vector contains information about events on each port. An interrupt is generated every time this vector is updated. In many instances, an interrupt vector contains a single event for a single port. This is problematic in operating environment such as Linux. For example, the Linux 2.6 kernel has a daemon called IRQ_balance, which balances interrupts across all multiple processors or central processing units (also referred to as CPU or CPUs). This daemon runs in a 10 second interval and determines which CPU has the least loaded to bind an interrupt. The IRQ_balance daemon binds the IRQ of the Ethernet adapter among all the CPUs in a round robin way. Every time that the IRQ line is bound to a new CPU, the data of a port needs to be moved to the new CPU. This can cause a large number of cache misses and contention, which drastically decreases system performance when all ports are being used.

Therefore a need exists to overcome the problems with the prior art as discussed above.

SUMMARY OF THE INVENTION

Briefly, in accordance with the present invention, disclosed are a method, information processing system, and computer readable medium for mitigating processor assignments. The method comprises assigning a first processor in a plurality of processors to a first communication port in a plurality of communication ports. An interrupt associated with the first communication port is generated. An assignment of a processor other than the first processor to handle the interrupt is inhibited.

In another embodiment an information processing system for mitigating processor assignments is disclosed. The information processing system comprises a memory and a processor that is communicatively coupled to the memory. The information processing system also includes an interrupt handler that is communicatively coupled to the memory and the processor. The interrupt handler is adapted to assign a first processor in a plurality of processors to a first communication port in a plurality of communication ports. An interrupt associated with the first communication port is generated. An assignment of a processor other than the first processor to handle the interrupt is inhibited.

In yet another embodiment, a computer readable medium for mitigating processor assignments is disclosed. The computer readable medium comprises instructions for assigning a first processor in a plurality of processors to a first communication port in a plurality of communication ports. An interrupt associated with the first communication port is generated. An assignment of a processor other than the first processor to handle the interrupt is inhibited.

One advantage of the various embodiments of the present invention is that when an interrupt occur within a multi-network adapter environment a new CPU is prevented from being bound to interrupt. This maintains port data within a single CPU. By maintaining the port data within a single CPU cache misses and contention can be avoided. This interrupt mitigation operation facilitates a higher packet throughput in Ethernet adapters that have more than one port sharing the same IRQ line.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and other similar terms as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Example of a Computing Environment

Figure 1:
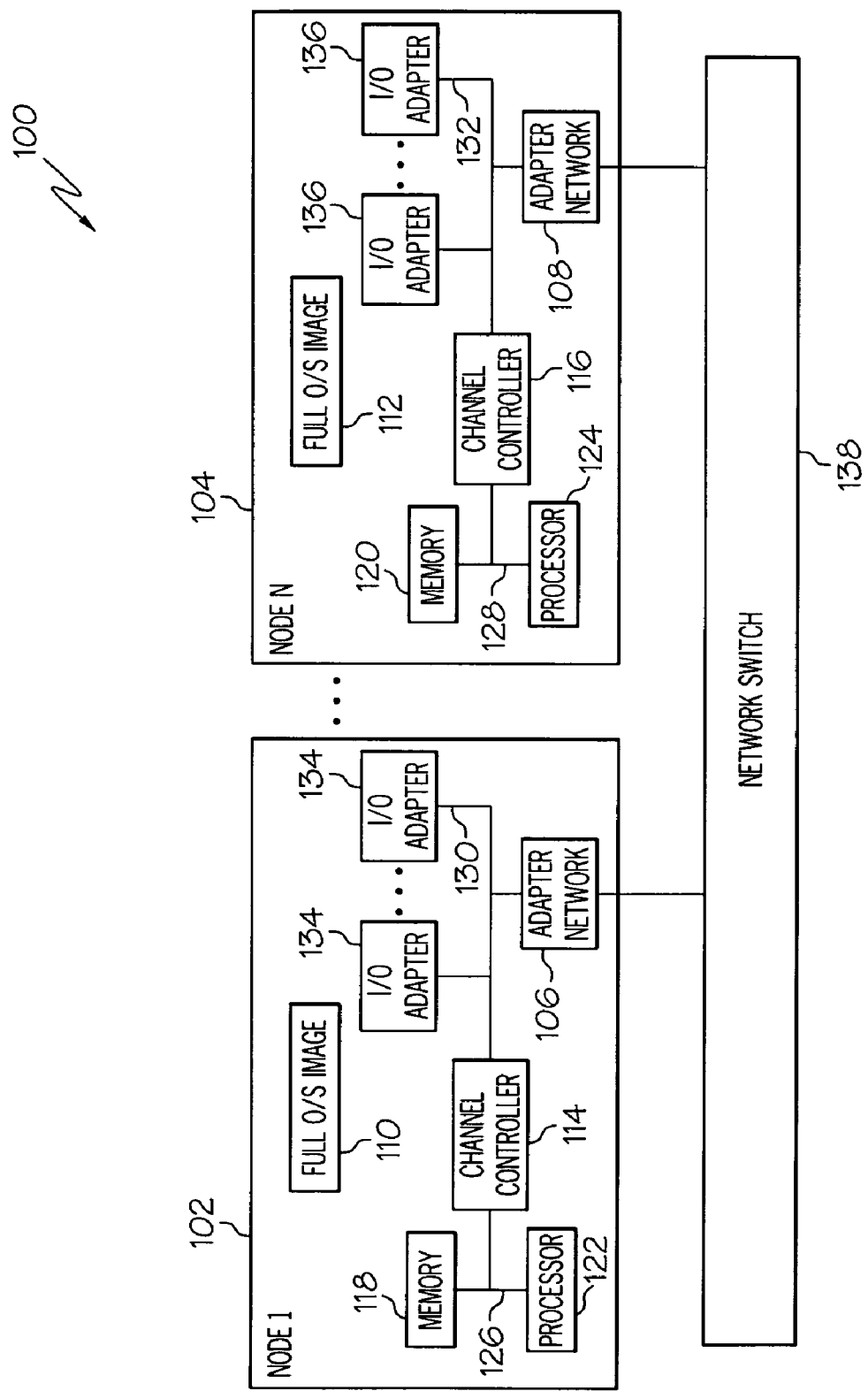
FIG. 1 is a block diagram illustrating an example of a computing environment according to one embodiment of the present invention.

FIG. 1 is a block diagram illustrating an example of a computing environment according to one embodiment of the present invention. It should be noted that the present invention can be scaled across multiple processing nodes such as in the computing environment of FIG. 1 or can reside at a single node.

In the illustrated embodiment, the computing environment 100 is one example of a distributed system in a symmetric multiprocessing ("SMP") computing environment. The computing environment 100 includes processing nodes 102, 104 coupled to one another via network adapters 106 and 108. Each processing node 102, 104 is an independent computer with its own operating system image 110, 112; channel controller 114,116; memory 118,120; and processor(s) 122, 124 on a system memory bus 126, 128. A system input/output bus 130, 132 couples I/O adapters 134,136 and network adapter 106, 108. Although only one processor 122, 124 is shown in each processing node 102, 104, each processing node 102, 104 is capable of having more than one processor. Each network adapter is linked together via a network switch 138. In some embodiments, the various processing nodes 102, 104 are part of a processing cluster.

Conventional Interrupt Path of a Device Driver

Figure 2:
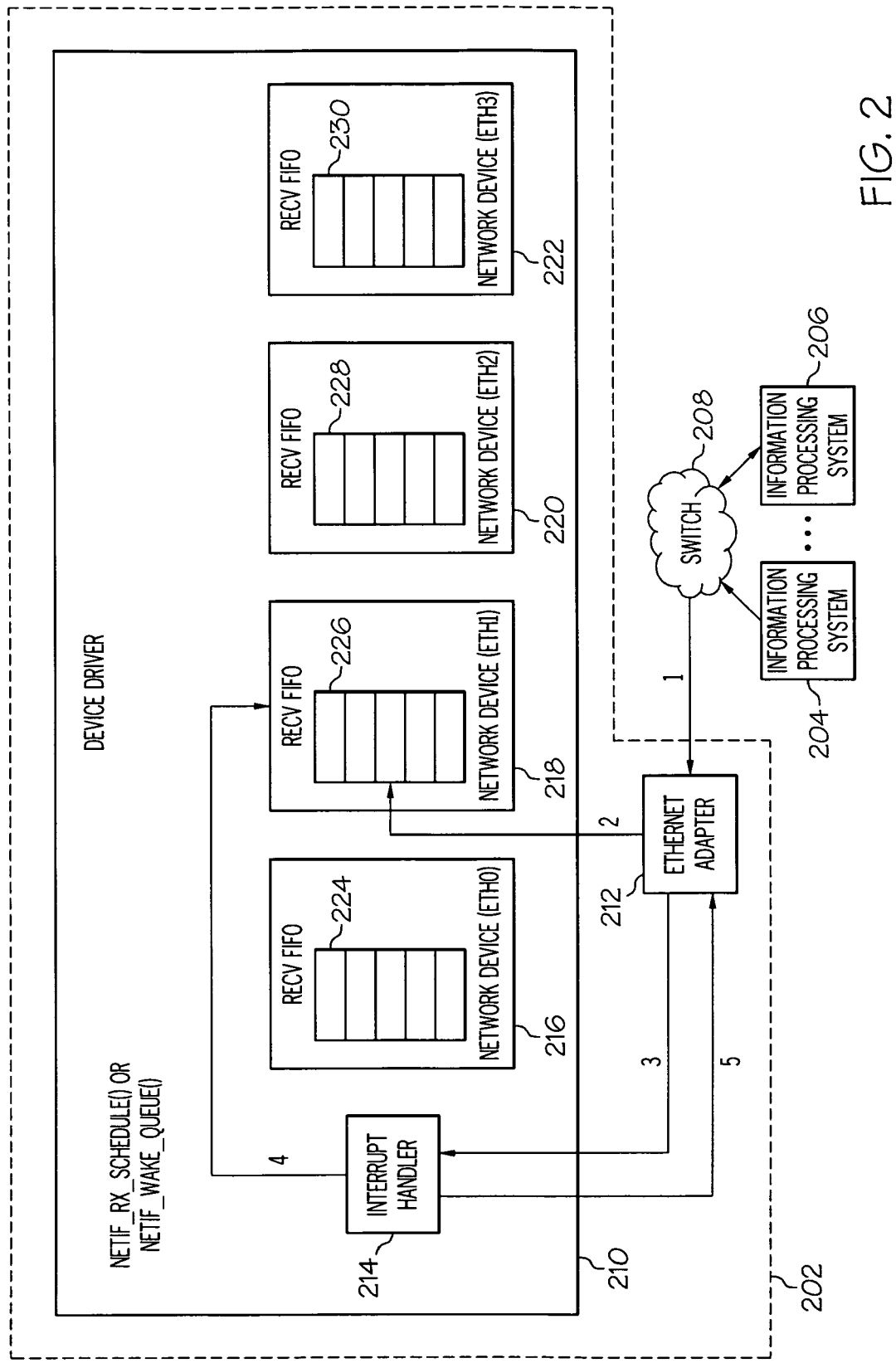
FIG. 2 is a block diagram illustrating a conventional interrupt path for a multi-network adapter environment.

FIG. 2 is a block diagram illustrating a conventional interrupt path of a device driver on an operating system such as Linux. In particular, FIG. 2 shows multiple information processing systems 202, 204, 206 communicatively coupled to each other via a switch 208. Each information processing systems 202, 204, 206 include, among other things, a device driver 210 and an Ethernet adapter 212. The device driver 210 is communicatively coupled to the Ethernet adapter 212 and includes an interrupt handler 214 and multiple communication ports 216, 218, 220, 220. It should be noted that a communication port according to one embodiment can be implemented as software and/or as hardware such as a network interface. In the example of FIG. 2, the device driver 210 includes ports P0 to P3. Each of the ports 216, 218, 220, 222 include a receive FIFO 224, 226, 228, 230 for storing packets received by the Ethernet adapter 212 and forwarded to the respect port.

At time T1, the Ethernet adapter 212 receives a data packet. The received data packet, at time T2, is transferred to the receive FIFO 226 of the port 218 associated with the data packet via a Direct Memory Access ("DMA"). The Ethernet Adapter 212, at time T3, raises an interrupt and the interrupt handler 214 of the device driver 210 is invoked. The interrupt handler 214, at time T4, analyzes an interrupt vector (not shown) to determine which event raised the interrupt. If the interrupt is a send event then the interrupt handler 214 call a function such as the netif_wake_queue( ) for the specific port 218. If the interrupt is a receive event then interrupt handler 214 calls a functions such as call netif_rx_schedule( ) for the specific port 218. The interrupt handler 214, at time T5, notifies the Ethernet adapter 212 that the interrupt was handled and exits. The two functions, netif_wake_queue and netif_rx_schedule, are the interface to an upper network layer within a kernel. The netif_wake_queue is called when the number of send buffers is running low and when the upper layer has been informed to stop the queue. This function wakes up the queue and allows the upper layer to start sending down more packets. The netif_rx_schedule function informs the upper layer that new packets have arrived. The upper layer eventually "comes down" to the driver to poll and process the packets.

As discussed above, the problem with the above configuration of the interrupt path is that each of the ports 216, 218, 220, 222 shares the same IRQ line. The interrupt handler 214 balances interrupts across all multiple CPUs in the system. The interrupt handler 214 binds the IRQ of the Ethernet adapter among all the CPUs in a round robin way. Therefore, each time the IRQ line is bound to a new CPU, the data of a port needs to be moved to the new CPU. This can causes cache misses and contentions.

Interrupt Mitigation

Therefore, to overcome the problems discussed above, the various embodiments of the present invention maintain the device data of a port in a specific CPU. This can be accomplished, in one embodiment, by binding the receive path of each port to a specific CPU. In an SMP system that has more processors than the Ethernet adapter ports, each port data (ethX) can be assigned to a specific CPU. For example port data eth0 for port 0 210 is assigned to CPU0; port data eth1 for port 1 218 is assigned to CPU1; port data eth2 for port 2 220 is assigned to CPU4; and port data eth3 for port 3 222 is assigned to CPU3.

However, as discussed above, when the Ethernet adapter 212 raises an interrupt, the interrupt handler 214 (which in a Linux environment uses the IRQ_balance daemon) binds the interrupt to a CPU with a lighter load. There is a high probability that the interrupt handler 214 will not bind the interrupt to the CPU that has been assigned to the port. Therefore, in one embodiment, if the interrupt handler 214 determines that the CPU handling the interrupt is not the same CPU that has been assigned to the port, the interrupt handler 214 invokes an IRQ set affinity function. The interrupt handler 214 uses the IRQ set affinity function to assign the Ethernet adapter interrupt line to a specific CPU. The interrupt handler, in this embodiment, does not deliver the received packet to its respective port, but instead resets the port receive interrupt threshold to the current number of received packets. This causes the Ethernet adapter 212 to immediately raise an interrupt, which is then bound at the desired CPU. That is, an assignment of a CPU other than the desired CPU to handle the interrupt is inhibited. Also, the IRQ set affinity function is not invoked if the interrupt handler contemporaneously receives packets for multiple ports. This is because if the interrupt is for multiple ports, i.e., multiple ports received packets, a CPU generally cannot be bound to multiple ports.

Figure 3:
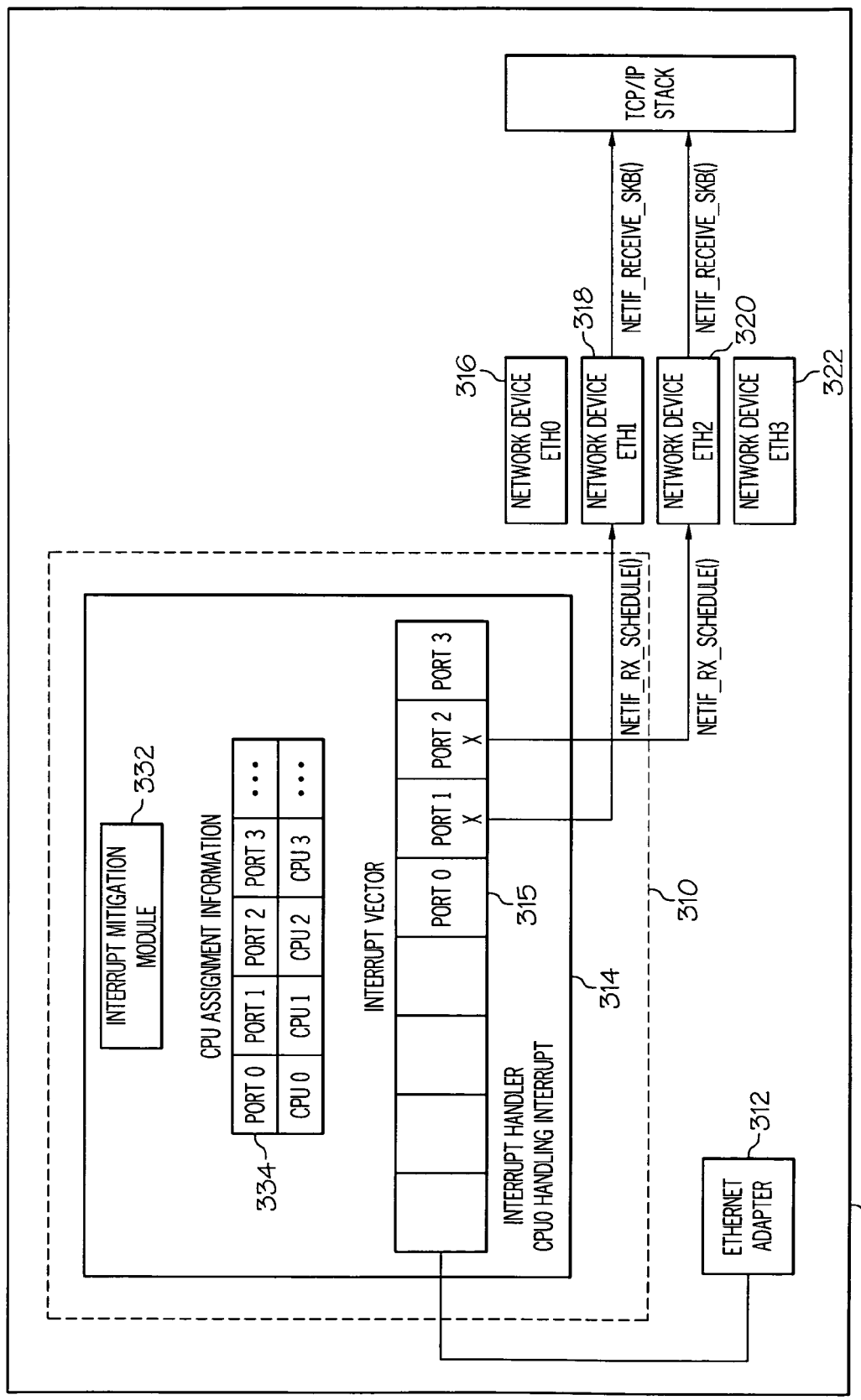
FIG. 3 is a block diagram illustrating an interrupt path for interrupt mitigation in a multi-network adapter environment according to one embodiment of the present invention.

FIG. 3 illustrates a modified interrupt path of a device driver for performing the interrupt mitigation operation discussed above. Similar to FIG. 2, FIG. 3 shows the interrupt handler 314 of a device driver (not shown) and a plurality of communication ports 316, 318, 320, 322. In addition, the interrupt handler 314 also includes an interrupt mitigation module 332 for performing the interrupt mitigation operation discussed above. As discussed above, each port 316, 318, 320, 322 has been assigned to a specific CPU. The interrupt handler 314 also includes this CPU assignment information 334. For example, the CPU assignment information 334 shows that port0 has been assigned to CPU 0; port1 has been assigned to CPU1; port2 has been assigned to CPU2; and port3 has been assigned to CPU3.

As discussed above, an Ethernet adapter 312 receives a data packet, which is transferred to the Receive FIFO slot of the appropriate port via a DMA operation. The Ethernet adapter 312 raises an interrupt and the interrupt handler 314 of the device driver is invoked. The interrupt handler 314 initiates the interrupt mitigation module 332 and analyzes the interrupt vector 315, which includes event information associated with each port 316, 318, 320, 322. The interrupt handler 314 analyzes the interrupt vector 315 to identify which event raised the interrupt. If the interrupt handler 314 determines that there is a send event or multiple receive packets for a given port in the interrupt vector 315, the interrupt mitigation module 332 calls a function such as the netif_wake_queue( ) for the respective communication port for each send event. The interrupt mitigation module 332 also calls a function such as the netif_rx_schedule( ) for the respective port for each receive event when multiple packets are received for multiple ports.

If the interrupt handler 314 determines that there is only one receive event in the interrupt vector for the given port, the interrupt mitigation module 332 checks if the CPU handling the interrupt is the CPU assigned to the port. For example, the CPU compares the identity of the CPU currently handling the interrupt with the CPU assignment information 334. If the interrupt mitigation module 332 determines that the CPU handling the interrupt is the CPU assigned to the port, the interrupt mitigation module 332 calls a function such as the netif_rx_schedule( ) for the respective communication port. This function delivers the received packet to the port. Because a new CPU was not assigned to the port, the port data remained within the port.

However, if the interrupt mitigation module 332 determines that the current CPU handling the interrupt is not the CPU assigned to the port, the interrupt mitigation module 332 performs an IRQ affinity function to set the assigned CPU to the current interrupt. The interrupt mitigation module 332 prevents the data packet from being delivered to the port. The interrupt mitigation module 332 also resets the port receive interrupt threshold to the current number of received packets. As discussed above, this causes the Ethernet adapter 312 to immediately generate an interrupt. Because of the IRQ affinity function performed by the interrupt mitigation module 332, the CPU that is handling this new interrupt is the CPU assigned to the port. The interrupt mitigation module 332 determines that the correct CPU is handling the interrupt and allows the data packet to be delivered to the port. The interrupt handler 314 subsequently notifies the Ethernet adapter 312 that the interrupt was handled and exits.

As can be seen, the various embodiments of the present invention ensure that a CPU assigned to a port handles interrupts for the port. This interrupt mitigation operation prevents a new CPU from being assigned to a port when an interrupt is bounded, thereby maintaining port data within a single CPU. By maintaining the port data within a single CPU cache misses and contention can be avoided. This interrupt mitigation operation facilitates a higher packet throughput in Ethernet adapters that have more than one port sharing the same IRQ line.

Example of an Information Processing System

Figure 4:
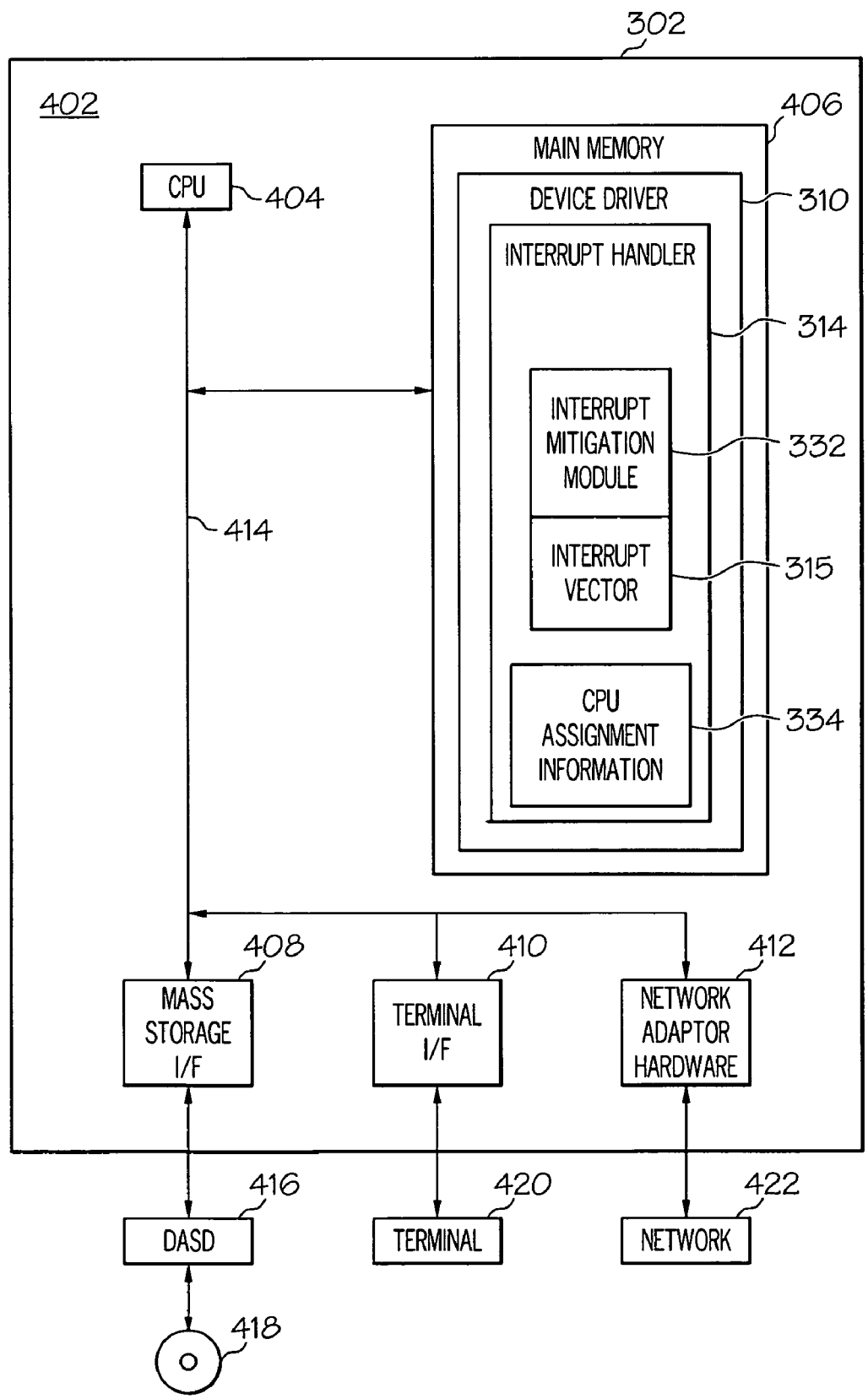
FIG. 4 is a block diagram illustrating an example of an information processing system according to one embodiment of the present invention.

FIG. 4 is a block diagram illustrating a more detailed view of an information processing system 302 according to one embodiment of the present invention. The information processing system 302 is based upon a suitably configured processing system adapted to implement one embodiment of the present invention, according to the present example. Any suitably configured processing system is similarly able to be used as the information processing system 302 by various embodiments of the present invention.

The information processing system 302 includes a computer 402. The computer 402 has a processor 404 that is connected to a main memory 406, mass storage interface 408, terminal interface 410, and network adapter hardware 412. A system bus 414 interconnects these system components. The mass storage interface 408 is used to connect mass storage devices, such as data storage device 416, to the information processing system 302. One specific type of data storage device is an optical readable disk (e.g., a CD 418 or DVD (not shown), which may be used to store data on. Another type of data storage device is a data storage device configured to support, for example, ext2 type file system operations. A data storage device is a type of computer readable medium. A computer readable medium can include any type of media, and including any memory, whether volatile or non-volatile, that can provide computer instructions and/or data to a computing system.

The main memory 406, in one embodiment, includes the device driver 310, which includes the interrupt handler 314. The interrupt handler 314 includes the interrupt mitigation module 332, the interrupt vector 315, and the CPU assignment information 334. Although illustrated as concurrently resident in the main memory 406, it is clear that respective components of the main memory 406 are not required to be completely resident in the main memory 406 at all times or even at the same time.

In one embodiment, the information processing system 302 utilizes conventional virtual addressing mechanisms to allow programs to behave as if they have access to a large, single storage entity, referred to herein as a computer system memory, instead of access to multiple, smaller storage entities such as the main memory 406 and data storage device 416. Note that the term "computer system memory" is used herein to generically refer to the entire virtual memory of the information processing system 302.

Although only one CPU 404 is illustrated for computer 402, computer systems with multiple CPUs can be used equally effectively. Various embodiments of the present invention further incorporate interfaces that each includes separate, fully programmed microprocessors that are used to off-load processing from the CPU 404. Terminal interface 410 is used to directly connect one or more terminals 420 to computer 402 to provide a user interface to the computer 402. These terminals 420, which are able to be non-intelligent or fully programmable workstations, are used to allow system administrators and users to communicate with the information processing system 302.

An operating system (not shown) included in the main memory is a suitable multitasking operating system such as the Linux, UNIX, Windows XP, and Windows Server 2001 operating system. Various embodiments of the present invention are able to use any other suitable operating system. Some embodiments of the present invention utilize architectures, such as an object oriented framework mechanism, that allow instructions of the components of operating system (not shown) to be executed on any processor located within the information processing system 302. The network adapter hardware 412 is used to provide an interface to a network 422. Various embodiments of the present invention can be adapted to work with any data communications connections including present day analog and/or digital techniques or via a future networking mechanism.

Although the embodiments of the present invention are described in the context of a fully functional computer system, those skilled in the art will appreciate that various embodiments are capable of being distributed as a computer readable medium, such as via CD 418 or DVD, flash, floppy disk, hard disk, tape, or other form of recordable media, volatile or non-volatile memory, or via any type of electronic transmission media mechanism. Generally, a computer storage program product refers to the program, including variables and data structures as may be part of the program, provided in a memory device and/or storage device and/or computer readable medium.

Operational Flow for Interrupt Mitigation

Figure 5:
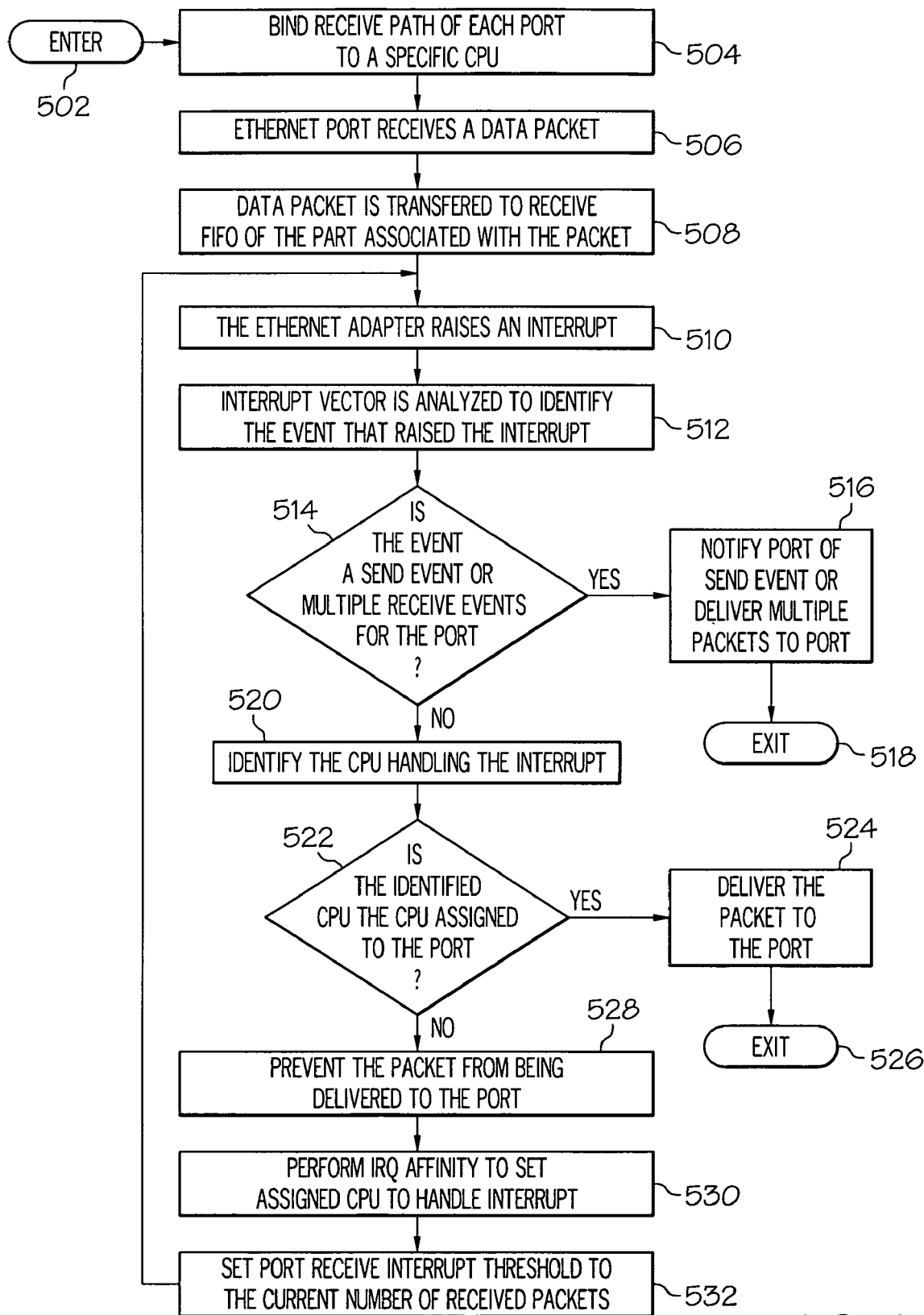
FIG. 5 is an operational flow diagram illustrating an overall process of interrupt mitigation in a multi-network adapter environment according to one embodiment of the present invention.

FIG. 5 is an operational flow diagram illustrating one example of an interrupt mitigation operation in a multi-network adapter environment. The operational flow diagram of FIG. 5 begins at step 502 and flows directly to step 504. The interrupt handler 314, at step 504, binds the receive path of each port 316, 318, 320, 322 to a specific CPU. The Ethernet adapter 312, at step 506, receives a data packet for a port 318. The data packet, at step 508, is transferred to the receive FIFO 226 for the port 318. The Ethernet adapter 312, at step 510, raises an interrupt.

The interrupt mitigation module 332 with the interrupt handler 314, at step 512, analyzes the interrupt vector 315 to identify the event that raised the interrupt. The interrupt mitigation module 332, at step 514, determines if the event was a send event or multiple receive events for multiple ports. In one embodiment, multiple receive events for multiple ports can occur substantially contemporaneously with each other. If the result of this determination is positive, the interrupt mitigation module 332, at step 516, notifies the port 318 of the send event or delivers the multiple packets to the multiple ports. The control flow then exits at step 518.

If the result of the determination at step 514 is negative, a single receive event has been identified. The interrupt mitigation module 332, at step 520, identifies the CPU currently handling the interrupt. The interrupt mitigation module 332, at step 522, determines if the identified CPU is the CPU that is assigned to the port 318. If the result of this determination is positive, the interrupt mitigation module 332, at step 524, delivers the packet to the port 318. The control flow then exits at step 526. If the result of this determination is negative, the interrupt mitigation module 332, at step 528 prevents the packet from being delivered to the port 318.

The interrupt mitigation module 332, at step 520 performs an IRQ affinity operation to set the CPU assigned to the port 328 to handle the interrupt. The interrupt mitigation module 332, at step 532, sets the port receive interrupt threshold to the current number of received packets for the port 318. This causes the Ethernet adapter 312 to generate an interrupt and the control flow returns to step 510. The CPU assigned to handle the interrupt is now the correct CPU that is assigned to the port 318.

NON-LIMITING EXAMPLES

The present invention can be realized in hardware, software, or a combination of hardware and software. A system according to one embodiment of the invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program". The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method with an interrupt handler for mitigating processing overhead of processor assignment, the method comprising:

assigning a first processor in a plurality of processors to a first communication port in a plurality of communication ports;

generating an interrupt associated with the first communication port; and inhibiting an assignment of a processor other than the first processor to handle the interrupt.

2. The method of claim 1, wherein the inhibiting further comprises:

determining, in response to the interrupt that has been generated, that a processor other than the first processor is to be assigned to handle the interrupt; and setting the first processor to handle the interrupt.

3. The method of claim 2, wherein the determining that a processor other than the first processor is to be assigned to handle the interrupt, further comprises:

preventing a data packet associated with the interrupt from being forwarded to the first communication port.

4. The method of claim 1, further comprising:

determining that the interrupt is associated with a send event; and forwarding, in response to the determining, a send request associated with the send event to the first communication port.

5. The method of claim 1, further comprising:

determining that the interrupt is associated with a single data packet receive event.

6. The method of claim 1, further comprising:
setting a port receive interrupt threshold associated with the communication port to a number equaling a current number of received packets for the first communication port;
receiving another interrupt in response to the port receive interrupt threshold being set equal to the current number of received packets for the first communication port;
determining that a current processor assigned to handle the another interrupt is the first processor; and
forwarding, in response to determining that a current processor assigned to handle the another interrupt is the first processor, a received data packet associated with the interrupt to the first communication port.

7. The method of claim 1, further comprising:
determining that an interrupt is associated with at least one of a plurality of data packet receive events that occur contemporaneous to each other; and
forwarding, in response to the determining that an interrupt is associated with the at least one of a plurality of data packet receive events, received data from each corresponding data packet receive event in the plurality of data packet receive events to a communication port associated with the corresponding data packet receive event.

8. An information processing system for mitigating processing overhead of processor assignment, the information processing system comprising:
a memory;
a processor communicatively coupled to the memory;
an interrupt handler communicatively coupled to the memory and the processor, wherein the interrupt handler is adapted to:
assign a first processor in a plurality of processors to a first communication port in a plurality of communication ports;
receive an interrupt associated with the first communication port; and
inhibit an assignment of a processor other than the first processor to handle the interrupt.

9. The information processing system of claim 8, wherein the interrupt handler is further adapted to:
determine, in response to receiving the interrupt, that a processor other than the first processor is to be assigned to handle the interrupt; and
set the first processor to handle the interrupt.

10. The information processing system of claim 9, wherein the interrupt handler is further adapted to determine that a processor other than the first processor is to be assigned to handle the interrupt by:
preventing a data packet associated with the interrupt from being forwarded to the first communication port.

11. The information processing system of claim 8, wherein the interrupt handler is further adapted to:
determine that the interrupt is associated with a send event; and
forward, in response to determining that the interrupt is associated with a send event, a send request associated with the send event to the first communication port.

12. The information processing system of claim 8, wherein the interrupt handler is further adapted to:
determine that the interrupt is associated with a single data packet receive event.

13. The information processing system of claim 8, wherein the interrupt handler is further adapted to:
setting a port receive interrupt threshold associated with the communication port to a number equaling a current number of received packets for the first communication port;
receiving another interrupt in response to the port receive interrupt threshold being set equal to the current number of received packets for the first communication port;
determining that a current processor assigned to handle the another interrupt is the first processor; and
forwarding, in response to determining that a current processor assigned to handle the another interrupt is the first processor, a received data packet associated with the interrupt to the first communication port.

14. The information processing system of claim 8, wherein the interrupt handler is further adapted to:
determine that an interrupt is associated with at least one of a plurality of data packet receive events that occur contemporaneous to each other; and
forward, in response an interrupt being associated with the at least one of a plurality of data packet receive events, received data from each corresponding data packet receive event in the plurality of data packet receive events to a communication port associated with the corresponding data packet receive event.

15. A computer storage program product for mitigating processing overhead of processor assignment, the computer storage program product comprising instructions for:
assigning a first processor in a plurality of processors to a first communication port in a plurality of communication ports;
generating an interrupt associated with the first communication port; and
inhibiting an assignment of a processor other than the first processor to handle the interrupt.

16. The computer storage program product of claim 15, wherein the instructions for inhibiting further comprise instructions for:
determining, in response to the interrupt that has been generated, that a processor other than the first processor is to be assigned to handle the interrupt; and
setting the first processor to handle the interrupt.

17. The computer storage program product of claim 16, wherein the instructions for determining that a processor other than the first processor is to be assigned to handle the interrupt, further comprise instructions for:
preventing a data packet associated with the interrupt from being forwarded to the first communication port.

18. The computer storage program product of claim 15, further comprising:
determining that the interrupt is associated with a send event; and
forwarding, in response to the determining, a send request associated with the send event to the first communication port.

19. The computer storage program product of claim 15, further comprising instructions for:
determining that the interrupt is associated with a single data packet receive event.

20. The computer storage program product of claim 15, further comprising instructions for:

setting a port receive interrupt threshold associated with the communication port to a number equaling a current number of received packets for the first communication port;

receiving another interrupt in response to the port receive interrupt threshold being set equal to the current number of received packets for the first communication port;

determining that a current processor assigned to handle the another interrupt is the first processor; and forwarding, in response to determining that a current processor assigned to handle the another interrupt is the first processor, a received data packet associated with the interrupt to the first communication port.

\* \* \* \* \*